United States Patent Office 3,421,971
Patented Jan. 14, 1969

3,421,971
WEATHERABLE PLASTIC LAMINATES
Musa Rasim Kamal, Hamden, Conn., assignor to Formica Corporation, Cincinnati, Ohio, a corporation of Delaware
No Drawing. Filed Jan. 7, 1966, Ser. No. 519,186
U.S. Cl. 161—184          7 Claims
Int. Cl. B32b 27/38; B32b 27/30

This invention relates to novel unitary heat and pressure consolidated weatherable laminated articles and to processes for preparing such articles.

More particularly, this invention deals with novel heat and pressure consolidated thermoset resin-bonded multilayer laminates which may be either transparent or colored as the case may be, but in either case are suitable for outdoor use because of their resistance to weathering. In essence, the laminate structure comprises a base or substrate member which is a plastic material, preferably a thermoplastic synthetic resin such as polyvinyl chloride or a thermosetting resin such as a cross-linked polyester. Superimposed upon this substrate of less weatherable plastic, is a quite useful protective overlay of a substantially transparent adherable thin film of polyvinyl fluoride having therein a suitable ultra-violet absorber and bonded directly to the plastic substrate member by means of a thermoset adhesive resin. By the use of the term "thermosetting adhesive," I intend to refer primarily to a curable resinous composition comprising a reactive water insoluble, essentially linear thermoplastic vinyl copolymer and a cross-linking amount of either a 3,4-epoxy-cyclohexylmethyl 3,4-epoxycyclohexanecarboxylate or hexamethoxymethylmelamine.

By way of background of the present invention, it should be pointed out that polyvinyl fluoride is an example of an overlay fluorocarbon film which has enjoyed wide acceptance due to its ability to maintain toughness and flexibility over wide ranges of temperature and other conditions of outdoor use. Such overlay films are resistant to attack by chemicals and other common solvents and are available in an unpigmented, substantially transparent form. However, to be effective and thus gain the advantage of the aforesaid properties of polyvinyl fluoride overlay films, it is essential that a firm bond be established and maintained between the substantially transparent adherable polyvinyl fluoride surface film and the base or substrate member which supplies rigidity to the laminate. In the past, various transparent adhesive resins of the epoxy, acrylic and polyester types have been suggested for this bonding of the fluorocarbon film to the substrate. None of these have been particularly suitable to effectively bond the substantially transparent grade of polyvinyl fluoride film to a plastic substrate such as polyvinyl chloride or a polyester type of core material, to achieve a weather-resistant transparent laminated article.

Where the substrate has been pigmented, particularly with a white pigment, a problem of "chalking" or migration to the surface of the resinous film of the pigment particles exists if the moisture and ultra-violet radiation make contact thereon. In addition, a color change takes place due to such radiant energy degradation. The inclusion of a compatible absorber material such as 2-hydroxy-4-methoxy-benzophenone, 2,2'-dihydroxy-4-methoxy benzophenone, 2-(2'-hydroxy-5'-methylphenyl) benzotriazole, etc. in the overlay will relieve this problem.

The primary object of the present invention is, therefore to provide a weather resistant laminated article having a substantially transparent top film of polyvinyl fluoride with an added ultraviolet absorber, which top film is tightly bonded to an underlying plastic substrate such, that the entire assembly, when heat and pressure consolidated, will yield a laminate useful in a wide range of outdoor architectural, building and industrial applications.

A further object of the invention is to provide a means for preparing such a laminate structure having the aforesaid beneficial attributes. These and other objects of the present invention will become obvious from the following description of my invention set forth below.

In accordance with the practice of my invention, therefore, a unitary heat and pressure consolidated weather resistant decorative laminate article is presented which comprises (I) a rigidity imparting plastic substrate or base member and (II) a substantially transparent top film of adherable polyvinyl fluoride, having at least one adherable side which is directly bonded to said rigidity imparting base member by means of a curable adhesive mixture comprising (A) a reactive water-insoluble, essentially linear copolymer of (1) from about 50% to 98% by weight, of a monoethylenically unsaturated hardening comonomer containing no functional groups reactive with component B, as defined herein below, (2) from about 50% to 2% by weight of a monoethylenically unsaturated comonomer containing at least one functional group reactive with component B, and (3) from about 0% to 45% by weight, of a monoethylenically unsaturated softening comonomer containing no functional groups reactive with component B, wherein the sum of the amounts of (1), (2) and (3) is 100%, and (B) a cross-linking amount of a member selected from the group consisting of a 3,4-epoxycyclohexylmethyl, 3,4-epoxycyclohexanecarboxylate and hexamethoxymethylmelamine.

A distinct feature of novelty of my unique laminated article is its base or core member. This member is of plastic composition and preferably is a thermoplastic synthetic resin such as polyvinyl chloride, although certain other thermosetting resins have also been notably useful in this regard. In addition to polyvinyl chloride, a cross-linked polyester reaction product of (a) an ethylenically unsaturated polyester derived from reaction of an unsaturated lower carboxylic acid and a polyhydric alcohol and (b) a partially unsaturated monomer may be employed. This product, is more particularly described in U.S. Patent 2,255,313 of Ellis of Sept. 9, 1941, as well as U.S. Patents 2,443,735 and 2,443,736 of Kropa of June 22, 1948, all of which documents are incorporated by reference herein. The aforesaid thermosetting resin has excellent heat resisting properties and may readily be admixed with glass fiber mats in up to 50% by weight, of the total composition to serve as a staunch substrate or base.

The prime function of our plastic base member is to supply rigidity to the laminate structure. It is, of course, to be understood that our novel laminate article may, itself, be supported by or bonded to any other convenient backing either organic or inorganic, i.e., in the latter case, for example, asbestos cement board or glass.

The polyvinyl fluoride film employed in the practice of this invention is a commercially available material having a thickness of from about 0.5 to 5 mils. The particular grade of film is that which is clear or substantially transparent, i.e., a film which is non-pigmented. In addition, the polyvinyl fluoride film must be pre-treated to render at least one side thereof adherable. By "adherable" is meant any condition imposed on a surface of the film by various physical or chemical techniques to render the surface of the film susceptible to bonding with conventional substrates, among which are included cellulosic materials, e.g., wood, paper, fiber board, and the like; metals, e.g., galvanized steel, aluminum, and the like; flexible plastics, felts, papers and the like; as well as conventional thermoplastic and thermosetting resinous surfaces.

Methods of manufacturing polyvinyl fluoride films useful in the present invention are well-known in the art and therefore, need not be described herein. One such method is that of U.S. Patent 2,953,818, herein incorporated by reference. The various treatments used to render one or both surfaces of polyvinyl fluoride films adherable are also known in the art, e.g., Belgian Patents 610,318, 619,638 and 620,723.

Thus, in Belgian Patent 619,638, there is described a method of making one side of a polyvinyl fluoride film adherable without affecting the non-adherability of the other side by passing the film around an electrically grounded rotating drum, while the outer face is electrically charged by passage close to a D.C. electrode, causing the film to adhere strongly to the drum. The film is next passed a certain distance from a set of tubular electrodes carrying an A.C. current. Nitrogen is flowed through the tubes and into the space between the electrodes and the drum. The film is then conducted away from the grounded drum. Belgian Patent 620,723 is a variation on the foregoing process and involves exposing the films of polymerized fluorinated hydrocarbons to an electric discharge in an atmosphere having a limited moisture content by passing the film around a grounded rotating drum serving as the negative electrode, with one or more positive electrodes affixed a certain distance from the drum and parallel to its axis of rotation. During this treatment, the atmosphere having limited moisture content is constantly renewed through outlets near the electrodes. For further details, see the aforementioned Belgian patents which are herein incorporated by reference.

A convenient method for determining whether a surface of a polyvinyl fluoride film is adherable for the purposes of the present invention is to compare the behavior of an unknwon film X to the behavior of a film N which is known to be nonadherable. Both films are cleaned with a cloth saturated with a solution of 30% by weight, n-propyl alcohol in water. After allowing the film to dry, a drop of the same solution is squeezed from an eye dropper onto the surface of each film. If the film X is adherable, the drop will spread at a rate approximately twice as fast as that on film N, i.e., the area covered by the drop on film X will be twice the area covered on film N over the same space of time. For example, after about 10–20 seconds from the time of application of the drop, if both films are nonadherable, the drops will spread at approximately the same rate in each application.

Substantially, transparent polyvinyl fluoride films treated to impart adherability on one or both sides may be used. When a film with a single adherable side is employed, the adherable side will, of course, be the side which is bonded to the substrate member.

The curable, adhesive mixture used to coat the substrate member comprises a mixture of two essential components, designated as A and B. Component A is a water-insoluble, essentially linear thermoplastic copolymer prepared from about 50% to 98% by weight, preferably from about 65% to 85% by weight, of (1) a monoethylenically unsaturated hardening comonomer containing no functional groups reactive with functional groups of cross-linking component B, having e.g., N-hydroxymethyl, N-alkoxymethyl, or epoxy groups, and from about 50% to 2% by weight, preferably from about 35% to 10% by weight, of (2) a monoethylenically unsaturated comonomer containing a functional group which is reactive with functional groups of cross-linking component B, having e.g., said above-mentioned N-hydroxymethyl, N-alkoxymethyl, or epoxy groups.

By "hardening comonomer" is meant a monomer, the homopolymer of which has a glass transition temperature above about 30–35° C. and which tends to form hard, relatively, inflexible polymers [Tg; see Tobolsky, "Properties and Structure of Polymers" (New York: John Wiley & Sons, Inc., 1960), pages 61–71]. The preferred comonomer (1) is methyl methacrylate. However, other lower alkyl esters of methacrylic acid wherein the lower alkyl group contains from 1 to 4 carbon atoms, e.g., ethyl methacrylate, propyl methacrylate, n-butyl methacrylate, isobutyl methacrylate, and the like, as well as mixtures thereof, can be employed, in addition to or instead of methyl methacrylate. Other hardening comonomers, which may be used in place of or in admixture with the lower alkyl esters of methacrylic acid include styrene, alkyl styrenes such as p-methyl styrene and the like, halostyrenes such as chlorostyrene and the like, acrylonitrile, methacrylonitrile, t-amyl methacrylate, t-butyl acrylate, t-amyl acrylate, benzyl methacrylate, vinyl chloride, and the like.

Comonomer (2) is an acrylic acid, including alkacrylic haloacrylic, and the like, or a mixture of such monomers, and in addition, is preferably a hardening comonomer. Preferred reactive group-containing monomers are acrylic acid, methacrylic acid, ethacrylic acid, α-chloroacrylic acid, and the like.

If desired, the reactive copolymer may also include (3) a monoethylenically unsaturated softening comonomer, i.e., a monomer the homopolymer of which has a glass transition temperature below about 15–20° C. and which tends to form soft, relatively flexible polymers, said softening comonomer containing no functional groups which are reactive with functional groups of cross-linking component B, e.g., N-hydroxymethyl, N-alkoxymethyl, or epoxy groups. These softening monomers, preferably comprise an alkyl ester of acrylic acid wherein the alkyl groups contain from 1 to about 12 carbon atoms, such as methyl acrylate, ethyl acrylate, propyl acrylate, n-butyl acrylate, 2-ethylhexyl acrylate, octyl acrylate, dodecyl acrylate, and the like, as well as mixtures thereof, and can be present in the copolymer in amounts ranging from 0% to about 45% by weight, and preferably from about 5% to about 25% by weight, based on the total weight of monomers in the copolymer, depending on the properties or combinations of properties, e.g., hardness coupled with flexibility, desired in the final product. Comonomer (3), if employed, will generally replace part of comonomer (1), but in any event, the copolymer will contain not less than about 50% by weight, based on the total weight of monomers in the copolymer, of hardening monomer(s). Furthermore, in every case the total amount of comonomers (1) and (2) or (1), (2) and (3) employed, will equal 100%.

Suitable emulsion and solution polymerization techniques for the preparation of reactive copolymers or terpolymers of the type employed in practicing the present invention from monomers such as those listed hereinabove are so numerous and so well-known in the art, that only the most cursory treatment of such technique is necessary here.

In general, where an emulsion system is used, the selected comonomers are emulsified in water, using from about 1% to about 10% by weight, based on the total weight of monomers present, of a conventional emulsifying agent. This emulsifying agent can be non-ionic, e.g., an alkylphenoxypolyethoxyethanol having alkyl groups of from about 7 to about 18 carbon atoms in length and from about 6 to about 60 oxyethylene units, such as the heptylphenoxypolyethoxyethanols, dodecylphenoxypolyethoxyethanols, and the like; a long chain fatty acid derivative of sorbitol, such as sorbitan monolaurate, monopalmitate, monostearate, tristearate, and the like; an ethylene oxide derivative of an etherified or esterified polyhydroxy compound having a hydrophobic carbon chain, such as a polyoxyethylene sorbitan monolaurate, monopalmitate, monostearate, and the like, anionic, e.g., sodium lauryl sulfonate, sodium isopropylnaphthalene sulfonate, di-2-ethylhexyl sodium sulfosuccinate, and the like, or cationic, e.g., stearamidopropylidimethyl-2-hydroxyethylammonium phosphate and the corresponding nitrate, stearyldimethylbenzylammonium chloride, and the like, as well as mixtures thereof.

The emulsified comonomers are copolymerized by means of a catalytic amount of a conventional free radical polymerization catalyst or catalyst system, e.g., an inorganic or organic peroxide such as hydrogen peroxide, t-butyl hydroperoxide, cumene hydroperoxide, and the like, an azo nitrile, such as $\alpha,\alpha'$-azobisisobutyrinitrile and the like, an inorganic persulfate, such as ammonium persulfate, sodium persulfate, potassium persulfate, and the like, or a redox catalyst system, such as sodium metabisulfitepotassium persulfate and the like. The particular catalyst or catalyst system chosen can generally be used in amounts ranging from about 0.01% to about 3% by weight, based on the total weight of comonomers present. The polymerization reaction can be carried out at a temperature ranging from about 0° C. to about 100° C., preferably, at from about room temperature 25° C. to about 70° C., and the emulsion will preferably be agitated during the reaction.

Solution polymerization of the selected comonomers is accomplished by dissolving them, together with a catalytic amount of a conventional free radical polymerization catalyst, e.g., one of the aforementioned organic peroxides, in a suitable inert organic solvent, such as acetone, methylethyl ketone, methyl isobutyl ketone, benzene, toluene, xylene, xylene-isobutanol mixtures, and the like, and heating the resulting solution at a temperature of from about 60° C. to about 190° C. until the desired degree of polymerization has taken place.

The copolymers obtained by the above-described emulsion polymerization technique can have molecular weights ranging from about 25,000 to about 1,000,000 or higher, as determined by intrinsic viscosity measurements [see Flory, "Principles of Polymer Chemistry" (Ithaca, N.Y.: Cornell University Press, 1953) pages 308 to 311], while the corresponding solution copolymers will generally have molecular weights ranging from about 10,000 to about 1,000,000, as also determined by intrinsic viscosity measurements.

The second essential component of the curable, adhesive mixture, component B, is a cross-linking agent which may be one of two materials or an admixture thereof. One cross-linking agent is a 3,4-epoxycyclohexylmethyl, 3,4-epoxycyclohexanecarboxylate, as exemplified particularly by 3,4-epoxy-6-methyl-cyclohexylmethyl, 3,4 - epoxy-6-methyl - cyclohexanecarboxylate. These 3,4-epoxycyclohexylmethyl, 3,4-epoxycyclohexanecarboxylates as well as methods of preparation are disclosed, for example, in U.S. Patents Nos. 2,716,123 and 2,890,209.

A further cross-linking agent is hexamethoxymethylmelamine. This compound is a commercially available material and methods of preparation are well-known in the art. This material is the hexaalkyl ether of hexamethylolmelamine and represents the highest degree of methylolation and alkylation obtainable of the melamine molecule. Various modifications and improvements on the basic process for preparing hexamethoxymethylmelamine have been developed such as those set forth in U.S. Patents Nos. 2,998,410 to Jefts et al. and 2,998,411 to Housekeeper, herein incorporated by reference.

The curable, adhesive mixture is prepared by dispersing the cross-linking agent in the copolymer emulsion or, where the copolymer has been prepared from an organic solvent solution, by dissolving the copolymer and cross-linking agent in a readily volatile inert organic solvent, e.g., one having a boiling point at atmospheric pressure between about 60° C. and 190° C., preferably between about 90° C. and 120° C. Such solvents include acetone, methyl ethyl ketone, diethyl ketone, benzene, toluene, xylene, ethyl acetate, butyl acetate, ethylene glycol monomethyl ether, dioxane, and the like, or a mixture of two or more of such solvents. As a third alternative, when the reactive copolymer is prepared by the emulsion polymerization technique, the emulsion or dispersion containing the copolymer may be first coagulated, e.g., by the addition of acetone, and the copolymer then separated from the coagulum and dissolved in an inert organic solvent. The cross-linking agent is then added. The weight ratio of reactive copolymer: cross-linking agent in solution can range from about 85:15 to about 60:40, respectively, and preferably from about 75:25 to about 65:35, respectively, while, for most applications, the total amount of the reactive copolymer plus cross-linking agent present in the impregnating solution can range from about 15% to about 60% by weight, and preferably from about 25% to about 50% by weight, based on the total weight of said solution.

It will be obvious to those skilled in the art that whether a high or low molecular weight copolymer is employed, the solids content of the adhesive mixture may be adjusted by dilution or concentration to obtain a suitable coating viscosity. Hence, molecular weights and solids content may be varied widely.

Any conventional method, e.g., dip-, brush-, flow-, roller- or spray-coating, can be used in coating the substrate member with the solution of the curable, adhesive mixture comprising the reactive copolymer and the cross-linking agent. The desired degree of coating can be achieved by one or several treating passes and, as can be readily appreciated, where several passes are made the solids content of the impregnating solution can be low, while for one-pass operations higher solids contents will be required. A coating of from about 5 to 20 grams of dry solids per sq. ft., preferably 7 to 15 grams per sq. ft., will be adequate to provide adhesion of the substrate to an adherable side of the substantially transparent polyvinyl fluoride top film.

Following coating, the substrate will be dried at a temperature high enough so that substantially all of the inert organic solvent will be driven off and yet low enough so that the curable resin will not be substantially advanced in cure, i.e., to the point at which this resinous reaction mixture will not exhibit satisfactory flow under the relatively high pressures encountered in the subsequent laminating step, and thus, will not flow sufficiently to eliminate small pits, dents and other minor imperfections in the resinous layer. However, a certain amount of advancement, i.e., cross-linking between the reactive copolymer and the cross-linking agent, is desirable prior to the time at which the entire laminating assembly is consolidated in a laminating press, inasmuch as this insures that the curable resinous composition will not be squeezed out of the substrate member in the press before being substantially completely cured. Furthermore, since cross-linking takes place fairly rapidly at temperatures above about 100° C., it is evident that any desired degree of advancement in cross-linking can be accomplished either during the drying step, if drying is carried out at sufficiently elevated temperature, or subsequent to the time at which the adhesive mixture-covered substrate can be considered substantially dry, by an additional heating period at temperatures substantially above room temperature, if drying is carried out at relatively lower temperatures, e.g., room temperature.

A two-stage method of coating and drying and partially advancing the curable resinous composition on the substrate is preferred. Tme first, or drying stage, involves drying the substrate at a temperature ranging from about room temperature, i.e., about 25° C., to not more than about 150° C. for from about 30 seconds at the upper temperatures in this range to several hours, e.g., four hours or more, at the lower end of the range, depending, of course, on the solvent employed as well as the drying temperature. Preferably, drying will be accomplished by subjecting the coated substrate to a temperature of from about 80° C. to about 130° C. for from about 3 minutes to about 10 minutes. A second coat of adhesive is then applied. The second drying stage, will be carried out at a temperature of from about 110° C. to about 150° C. for from about 2 minutes to about 10 minutes.

As previously indicated, coating, drying and partial advancement of the curable resinous composition used to treat the substrate can be carried out in one step or in separate stages. However, care must be taken to avoid heating the coated sheet to the point at which the inert organic solvent being given off causes bubbling, since this can cause discontinuity, which in turn leads to poor bonding, particularly if, at the same time, the curable resinous composition is advanced to the point at which its flow under the relatively high pressures applied in the subsequent laminating step will be substantially diminished. Thus, one step drying (coupled with partial advancement) will preferably be carried out at a temperature ranging from about 80° C. to about 150° C. for from about 20 minutes to about 5 minutes.

An alternative procedure would be to coat an adherable side of the polyvinyl fluoride surface film with the thermosetting resinous adhesive mixture, partially advance the cure of the resin, and then proceed with the heat-and-pressure-consolidation step to bond the overlay film to the rigidity-imparting base member. Moreover, it has been found that a thickness of at least one sixteenth of an inch for the base member is especially desirable when the laminate is consolidated in an initial laminating step by means of heat and pressure or afterwards by adhesive bonding, with an additional solid or precured substrate of asbestos-cement board, wood, cellulose, particle board, or the like, in that base members having at least this minimum thickness are better able to relieve or take up stresses produced by various additional substrates or backing surfaces certain of which are relatively dimensionally unstable, thereby insuring the prevention of cracking or crazing on the decorative surface of the laminate. It has also been found that the thickness of the solid substrate should be correlated with its density whereby said substrate is adapted to retain its form under moderate stress. The maximum thickness of any of the base members in question is governed by practical considerations, e.g., cost, availability, where and how the finished laminate is to be used, and so forth.

Conventional laminating techniques are employed in preparing laminates from the above-described base members, and substantially transparent top films. Thus, the adherable polyvinyl fluoride top film is placed with an adherable side against the thermosetting adhesive mixture-covered side of the substrate member or, where the polyvinyl fluoride top film is coated with the adhesive resin on an adherable side, said film is placed with its coated side against the substrate member. Then top film and substrate are assembled and inserted in a laminating press between laminating press plates which may have finishes ranging from a mirror polish to a matt surface, either as a single assembly or as a multiple assembly of two or more of such single assemblies, and consolidated by means of heat and pressure into a unitary decorative structure. Besides laminates having only one decorative surface, balanced laminates wherein an adherable polyvinyl fluoride film having a suitable ultra-violet absorber is bonded to each side of a base or core member may also be prepared.

Temperatures ranging from about 135° C. to about 160° C., preferably from about 140° C. to about 150° C., and pressures ranging from about 150 p.s.i. to about 1500 p.s.i., will be employed when the acrylic adhesive is used. The particular pressure employed depends in large measure upon the nature of the base member, and the degree of advancement of the adhesive employed. The time required to effect substantially complete cure of the resinous components of the assembly when employing temperatures and pressures within the above-stated ranges will usually be from 15 minutes to about 45 minutes. The resulting laminate is generally allowed to cool to a temperature of less than about 50° C., and preferably to room temperature, before being removed from the press.

In order that those skilled in the art may more fully understand the inventive concept presented herein, the following examples are set forth. These examples are set forth primarily for illustration, and should not be considered as expressing limitations unless so set forth in the appended claims. All parts and percentages are by weight, unless otherwise stated.

Preparation of curable acrylic type adhesive resins

An adhesive mixture typical of the curable adhesive resins useful in the practice of the present invention may be prepared as follows:

Adhesive Resin A.—(Based on 90/10-methyl methacrylate/methacrylic acid)

A solution containing 6 parts of dioctyl sodium sulfosuccinate, 11.4 parts of a 70% active solution of a octylphenol-ethylene oxide condensate, and 0.8 part of sodium bicarbonate dissolved in 1100 parts of water is charged to a suitable reaction vessel equipped with thermometer, stirrer, reflux condenser, inert gas inlet tube and an addition funnel. After flushing the solution with nitrogen gas for 30 minutes (a stream of nitrogen gas is employed to maintain an inert atmosphere throughout the reaction) and then heating it to 60° C. with stirring (stirring being maintained throughout the preparation), a solution of 1 part of ammonium persulfate in 100 parts of water is added. Five minutes later, after heating the resulting solution to 75° C., 164 parts of a monomer-emulsifier mixture containing 720 parts of methyl methacrylate, 80 parts of methacrylate acid and 17.2 parts of the same octylphenolethylene oxide condensate solution used above are added. At this point, the temperature of the resulting emulsified reaction mixture will rise exothermally to 85° C. When the temperature begins to drop, the remainder of the monomer-emulsifier mixture is added dropwise to the emulsion over a period of about one hour, during which time the temperature is maintained at between 77° C. and 82° C. After the last addition of the monomer-emulsifier mixture, the emulsion is maintained at between about 75° C. and 80° C. for 30 minutes and then allowed to cool to room temperature. During cooling, the reflux condenser and thermometer are removed and a rapid stream of nitrogen gas is passed through the reaction vessel to remove any unreacted monomers. Finally, the pH is adjusted to 8.2 with concentrated ammonia and the product is then filtered through cheesecloth, to give an aqueous polymer dispersion having a solids content of 45.7%.

A quantity of this resinous dispersion is admixed with sufficient methylethyl ketone to coagulate and precipitate the methyl methacrylate/methacrylic acid copolymer. The coagulum is then poured into a shallow container and dried at 80° C. until substantially all of the ketone and water have evaporated. Next, the copolymer solids are dissolved in the ketone to give a 50% solution, and to this solution there is then added and dissolved an amount of 3,4 - epoxy - 6 - methyl-cyclohexylmethyl, 3,4-epoxy-6-methylcyclohexane-carboxylate (hereinafter called "diepoxide") sufficient to result in a weight ratio of copolymer solids: diepoxide of 100:30, respectively.

Preparation of adhesive resins B–K

In a manner similar to that set forth for the preparation of adhesive resin A, the aqueous dispersions described in Table I below in terms of their polymeric components, pH's and solids concentrations may be prepared, coagulated, and dissolved in organic solvent in preparation for use as adhesives.

TABLE I

| Dispersion | Polymeric component [1] | pH | Percent solids concentration |
|---|---|---|---|
| B | 60/30/10—MMA/EA/MAA | 7.6 | 41 |
| C | 60/35/5—MMA/EA/MAA | 7.1 | 41.7 |
| D | 45/25/20/10—MMA/EA/AN/MAA | 7.5 | 39 |
| E | 50/25/20/5—MMA/EA/AN/MAA | 7.6 | 42 |
| F | 85/15—BMA/MAA | 7.5 | 35 |
| G | 60/25/15—MMA/BMA/MAA | 7.0 | 35 |
| H | 75/15/10—MMA/EHA/MAA | 7.8 | 41 |
| I | 80/10/10—MMA/EA/MAA | | 50 |
| J | 50/25/5—MMA/EA/AN/MAA | | 40 |
| K | 60/35/5—S/EA/MAA | 8.1 | 40 |

[1] Monomers are expressed in parts, e.g., Dispersion B contains a copolymer of 60 parts of methyl methacrylate, 30 parts of ethyl acrylate and 10 parts of methacrylic acid.
MMA=methyl methacrylate, BMA=butyl methacrylate, S=styrene, EA=ethyl acrylate, EHA=2-ethylhexyl acrylate, AN=acrylonitrile, MAA=methacrylic acid, MA=methacrylamide.

The following embodiments of my invention are intended to illustrate the use of the aforesaid adhesive resin in the actual construction of laminate articles. As a typical member of the arcylic type adhesive, I have selected the I adhesive formulation from the broad class of acrylic type adhesive compositions. These examples are as follows:

Example 1

The adherable side of a commercially available polyvinyl fluoride film containing an ultraviolet absorber therein was coated with a solution of adhesive resin (I), shown above, in a methyl etyhl ketone solution by brushing the adhesive solution thereon. The coated polyvinyl fluoride film has a resin pickup of the curable resinous composition (reactive copolymer and diepoxide crosslinker) of 8 grams/ft.[2] This coated film is then air-dried in an oven at 130° C. to allow the ketone solvent to evaporate therefrom.

The dried and coated polyvinyl fluoride film is then placed on top of a ⅛" sheet of clear, rigid polyvinyl chloride with the coated side of the polyvinyl fluoride film contacting the polyvinyl chloride sheet. The assembly is then positioned between a pair of stainless steel press plates having a mirror polish finish and laminated at a pressure of 600–800 p.s.i., while heating the press from room temperature to 80° C. When the temperature reaches 80° C., the pressure is reduced gradually, until final cure is achieved by maintaining a pressure of 100–200 p.s.i., at the maximum cure temperature of 145° C for 30 minutes. The resulting laminate, after being allowed to cool to room temperature, is removed from the press, and has a smooth, glossy surface.

Example 2

Proceed as in Example 1 above, except that two polyvinyl fluoride films are coated on the adherable side with the same adhesive as above in an identical manner.

The laminating assembly consists of a sandwich with the polyvinyl chloride sheet in the middle and a coated polyvinyl fluoride film on each side. The coated side of each of the films is placed in contact with the polyvinyl chloride sheet.

The laminating procedure is identical with that in Example 1. An advantage of this construction is that it yields mechanically balanced systems with protection from the effects of ultraviolet energy on both sides of the polyvinyl chloride sheet.

Example 3

On a smooth glass plate, a 10 mil film of white pigmented commercially available polyester gel coat resin was drawn down with a draw blade. The resin contained one part by weight, of methyl ethyl ketone peroxide per 100 parts by weight of the resin. After the resin has gelled in 30–45 minutes, a film of commercial adherable polyvinyl fluoride, 1.5 mils thick and incorporating an ultraviolet absorber was placed on top of the gel coat surface and pressed to insure intimate contact. The polyvinyl fluoride film had been treated on the adherable side with Adhesive I and dried as described in Example 1. When the film was placed on top of the gel coat, care was taken to place the adhesive treated side of the film in contact with the gel coat.

The assembly was then removed from the glass plate and placed between two stainless steel press plates having a mirror polish finish with a film of cellophane on each side to separate the resin from direct contact with the press plates. The assembly of all these components was then placed in the press and alloyed to cure at 145° C. An initial pressure of 200 p.s.i. was applied for 2 minutes, then the pressure was raised to 700 p.s.i., and was maintained at that level for 20 minutes. After cooling, the press plates and their contents were removed from the press. The gel coat with the polyvinyl fluoride coating on one side was released from the cellophane film, and was placed on smooth glass plate with the polyvinyl fluoride side contacting the glass.

A sheet of glass mat was laid on top of the gel coat, and a curable commercially available polyester resin (which is a resinous formulation comprising propylene glycol, phthalic anhydride, fumaric acid, hydroquinone, cobalt metal, and a mixture of 62% alkyd condensate with 38% styrene monomer) combined with 1% by weight methyl ethyl ketone peroxide catalyst was poured on the glass mat until it is saturated. The whole assembly of glass plate, laminate, glass mat, and polyester resin was then wrapped in cellophane, and the resin was worked to smooth it and remove bubbles. After smoothing, the whole assembly was allowed to cure at room temperature. This takes a few hours. After curing, the laminate when released from the cellophane, has a smooth, glossy decorative surface and is quite rigid.

In the aforesaid example, use of about 1 percent of an ultra-violet absorber such as 2-hydroxy-4-methoxy benzophenone in the overlay resin, will give a product having the properties of good color stability and clarity. For a comparison of the products of the invention when contrasted with untreated materials, see Table I, herein below. As will be noted from the table, the laminate structures which lack a clear polyvinyl fluoride overlay have a very poor resistance to exposure, in addition to exhibiting profound color change and chalking in that instance, where the substrate is pigmented.

It should, also be pointed out that while applicant has expressed certain preferences for ultra-violet light absorbers, it of course, now becomes obvious to those skilled in the art that a large number of such asborbers as illustrated by U.S. Patent No. 2,777,828, to Day, incorporated by reference herein, may also be employed. It is applicant's intention to embrace these also.

TABLE I.—WEATHEROMETER EXPOSURE DATA ON PLASTIC SYSTEMS PROTECTED WITH POLYVINYL FLUORIDE

| Sample number | Plastic substrate | Color | Clear ployvinyl floride coating | Adhesive Type | Weatherometer exposure, hours | Color Change, E | Notes |
|---|---|---|---|---|---|---|---|
| 9-63-9 | Polyvinyl chloride | Clear | None | None | 2,000 | 47.7 | |
| 9-63-7 | do | do | 1 mil | Acrylic (I) | 5,000 | 10.6 | |
| 8-63-31 | Linear polyester | White gel coat | None | None | 5,000 | 5.4 | Chalking. |
| 8-63-32 | do | do | 1 mil | Acrylic (I) | 5,000 | 2.9 | No chalking. |

What is claimed is:

1. A unitary, heat and pressure consolidated weather resistant laminate which consists of:
   (I) a rigidity imparting resinous plastic substrate in sheet form and
   (II) at least one adjacent sheet of a substantially transparent overlay member of adherable polyvinyl fluoride, an adherable side of which is directly bonded to said substrate member by means of a curable adhesive mixture which comprises:
      (A) a reactive, water-insoluble, essentially linear thermoplastic copolymer of
         (1) from about 50% to 98% by weight of a monoethylenically unsaturated hardening comonomer containing no functional groups reactive with component (B), as defined hereinbelow,
         (2) from about 50% to 2% by weight of a monoethylenically unsaturated comonomer containing at least one functional group reactive with component (B), and
         (3) from about 0% to 45% by weight of a monoethylenically unsaturated softening comonomer containing no functional groups reactive with component (B), wherein the sum of the amounts of (1), (2) and (3) is 100%, and having an ultra-violet light absorber incorporated in said overlay member,
      (B) a cross-linking amount of an agent selected from the group consisting of a 3,4-epoxy-cyclohexylmethyl, 3,4-epoxy-cyclohexanecarboxylate and hexamethoxymethylmelamine.

2. A unitary heat and pressure consolidated weather resistant laminate structure according to claim 1 wherein the curable adhesive component (A)(1) is a lower alkyl ester of methacrylic acid.

3. A unitary heat and pressure consolidated weather resistant laminate structure according to claim 1 wherein the curable adhesive component (A)(1) is a lower alkyl ester of methacrylic acid and the adhesive component (A)(2) is an acrylic acid.

4. A unitary heat and pressure consolidated weather resistant laminate structure according to claim 1 wherein (I) is polyvinyl chloride.

5. A unitary heat and pressure consolidated weather resistant laminate structure according to claim 1 wherein the plastic substrate member (I) is a cross-linked linear unsaturated polyester.

6. A unitary heat and pressure consolidated weather resistant laminate structure according to claim 4 which comprises a substantially transparent overlay member of adherable polyvinyl fluoride containing as an ultra-violet light absorber, a substituted benzophenone.

7. A unitary heat and pressure consolidated weather resistant laminate structure according to claim 1 wherein the substrate is polyvinyl chloride, the curable adhesive mixture is (A) wherein (A)(1) is a lower alkyl ester of methacrylic acid and (A)(2) is an acrylic acid and the polyvinyl fluoride overlay member contains an ultra-violet light absorber.

References Cited
UNITED STATES PATENTS

| | | | |
|---|---|---|---|
| 2,970,066 | 1/1961 | Brasure | 117—33.3 |
| 3,133,854 | 5/1964 | Simms | 161—189 |
| 3,194,725 | 7/1965 | Pounds | 161—165 |
| 3,220,916 | 11/1965 | Petropoulos | 161—413 X |
| 3,228,823 | 1/1966 | Usala et al. | 161—186 |
| 3,257,266 | 6/1966 | Sapper | 161—189 X |
| 3,340,137 | 9/1967 | Kamal | 161—189 X |
| 3,379,606 | 4/1968 | Bratton et al. | 161—189 |

HAROLD ANSHER, *Primary Examiner.*

U.S. Cl. X.R.

161—189, 256